(12) United States Patent
Werner et al.

(10) Patent No.: US 6,508,130 B2
(45) Date of Patent: Jan. 21, 2003

(54) PRESSURE SENSOR WITH ENCAPSULATED CIRCUITRY

(75) Inventors: Thomas Werner, Wittlinger Strasse (DE); Thomas Uehlin, Blasistrasse (DE); Karl Flögel, Blasistrasse (DE)

(73) Assignee: Endress and Hauser GmbH + Co., Maulburg (DE)

( * ) Notice: Subject to any disclaimer, the term of this patent is extended or adjusted under 35 U.S.C. 154(b) by 46 days.

(21) Appl. No.: 09/776,756

(22) Filed: Feb. 6, 2001

(65) Prior Publication Data

US 2001/0013254 A1 Aug. 16, 2001

(30) Foreign Application Priority Data

Feb. 15, 2000 (EP) .............................. 00103016

(51) Int. Cl.[7] ................................. G01L 7/00
(52) U.S. Cl. ........................................ 73/756
(58) Field of Search ................. 73/706, 253, 756, 73/718–724; 338/2, 4, 36, 37, 42, 46, 47; 415/118, 143, 174; 361/283.1–283.4

(56) References Cited

U.S. PATENT DOCUMENTS

| | | |
|---|---|---|
| 4,617,607 A | 10/1986 | Park et al. |
| 5,034,848 A | 7/1991 | Rowlette et al. |
| 5,353,003 A | * 10/1994 | Maurer ..................... 338/47 |
| 5,571,970 A | 11/1996 | Mutoh et al. |
| 5,975,842 A | * 11/1999 | Jensen et al. ............... 415/118 |

OTHER PUBLICATIONS

Patent Abstracts of Japan, vol. 7, No. 60 (P–182), 57206842, Dec. 18, 1982, Sugano Masahi, Capacity Carying Type Pressure Sensor.

Patent Abstracts of Japan, vol. 9, No. 64 (P–343), 59198333, Nov. 10, 1984, Fujiwara Akinobu, Electrostatic Capacity Type Pressure Sensor.

* cited by examiner

Primary Examiner—William Oen
(74) Attorney, Agent, or Firm—Jones, Tullar & Cooper, P.C.

(57) ABSTRACT

A pressure sensor has a measuring cell, a measuring cell mount and an electronic sensor system connected to the measuring cell. The pressure sensor is designed as a modular unit in which the electronic sensor system and its electric connections are protected against moisture and mechanical loads, in which the electronic sensor system is embedded in a protective cushion, and in which the protective cushion is surrounded by an encapsulation.

8 Claims, 2 Drawing Sheets

PRESSURE SENSOR WITH ENCAPSULATED CIRCUITRY

BACKGROUND OF THE INVENTION

1. Field of the Invention

The invention relates to a pressure sensor and more particularly to a pressure sensor with encapsulated circuitry.

2. Brief Description of Related Art

Absolute-pressure and relative-pressure sensors, for example, are used in pressure measuring technology. In the case of absolute pressure sensors, a pressure to be measured is detected in absolute terms, that is to say as a pressure difference with respect to a vacuum. A relative pressure sensor picks up a pressure to be measured in the form of a pressure difference with respect to a reference pressure. The reference pressure is an ambient pressure which prevails where the sensor is located. In most applications, this is the atmospheric pressure at the location of use.

Pressure sensors are used in a multiplicity of branches of industry, for example in chemistry and in the food industry. Frequently to be found in these industries are large installations in which pressures are to be measured at several points for the purpose of detecting, controlling, regulating and/or automating a process running in the installation. Use is made in this case of a multiplicity of pressure sensor, for example with different measuring ranges.

It is therefore advantageous both for the user on site, and for the manufacturer of the pressure sensors-for reasons of storage, maintenance and practicability-to design pressure sensors as a modular assembly which can then, if required, be provided on site with, for example, a meter housing having an electronic system tailored to the application, or with a process connection suitable for the measuring place.

Pressure sensors usually have a measuring cell, a measuring cell mount and an electronic sensor system connected to the measuring cell. In the case of modular. pressure sensors, the electronic sensor system must be accessible so that it can be connected, for example, to a meter electronic system or a supply and/or signal evaluation unit. However, it is precisely the electronic sensor system and the electric connections thereof which are particularly sensitive to moisture and to mechanical loads.

SUMMARY OF THE INVENTION

It is an object of the invention to provide a pressure sensor having a measuring cell, a measuring cell mount and an electronic sensor system connected to the measuring cell, in the case of which the electronic sensor system and its electric connections are protected against moisture and mechanical loads.

For this purpose, the invention comprises a pressure sensor having
a measuring cell,
a measuring cell mount, and
an electronic sensor system connected to the measuring cell,
in which the electronic sensor system is encapsulated in a protective cushion, and
in which the protective cushion is surrounded by an encapsulation.

In accordance with a development of the invention, a seal is injected in a gap existing in the radial direction between the measuring cell and the measuring cell mount.

In accordance with a further development, because of the dimensions of the measuring cell, the injected seal and the measuring cell mount a thermal expansion of the measuring cell and injected seal in the radial direction is equal to a thermal expansion of the measuring cell mount in the radial direction.

In accordance with a preferred embodiment, the injected seal consists of a silicone or of polyurethane.

In accordance with a preferred embodiment, the protective cushion is a foam plastic.

In accordance with a further preferred embodiment, the foam plastic has open and closed cells.

In accordance with a further preferred embodiment, the encapsulation is a polyurethane.

In accordance with a development of the invention, the pressure sensor has a metallic cover which extends between the encapsulation and the protective cushion.

BRIEF DESCRIPTION OF THE DRAWINGS

The invention and further advantages are explained in more detail below with reference to the drawings, in which two exemplary embodiments are illustrated. Identical elements are provided in the figures with the same reference symbols.

DESCRIPTION OF THE PREFERRED EMBODIMENTS

Figure 1:
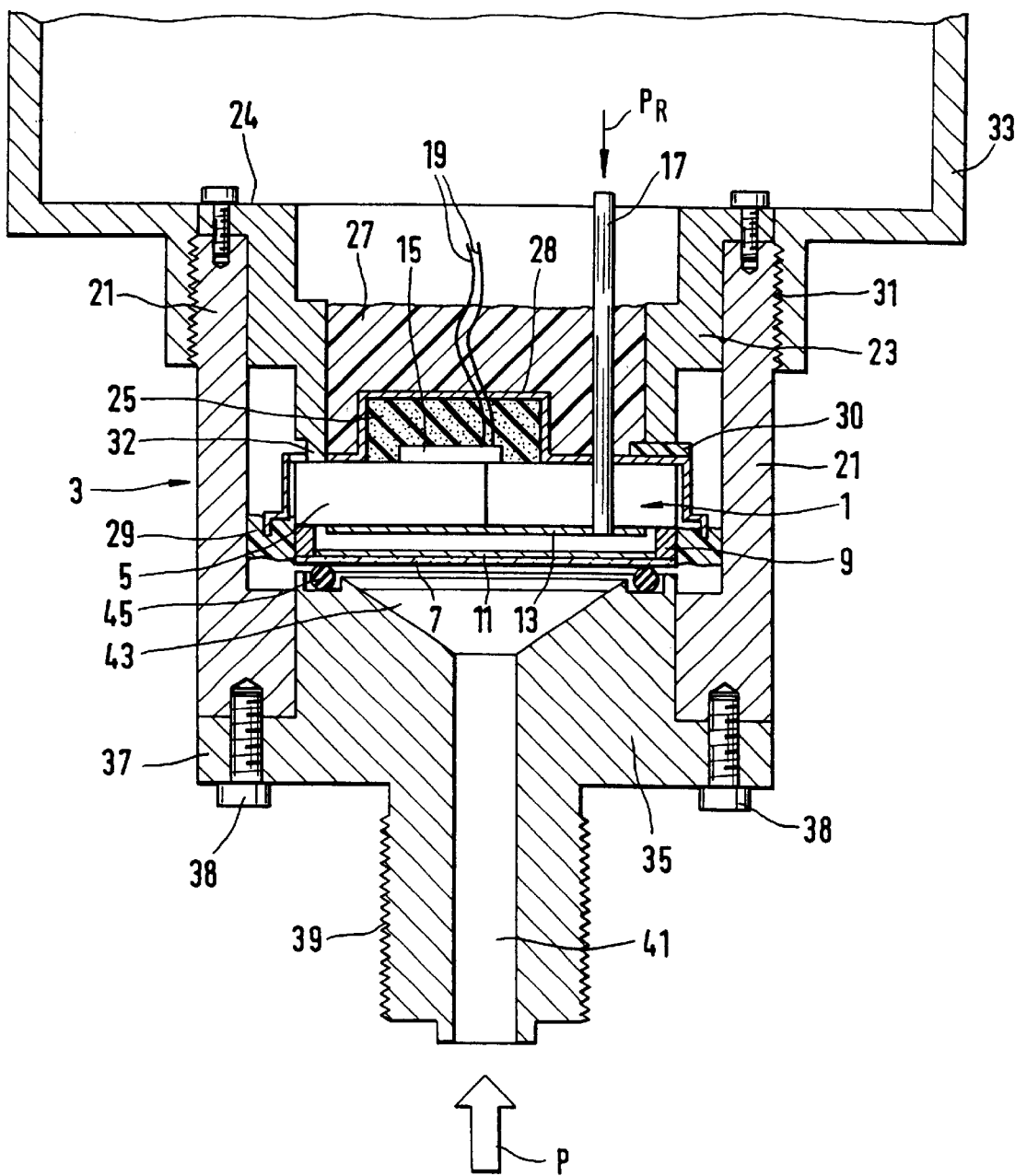
FIG. 1 shows a section through a pressure sensor which is connected to a meter housing and a process connection.

A pressure sensor according to the invention is illustrated in FIG. 1. It has a measuring cell 1 which is fixed in a measuring cell mount 3.

In the exemplary embodiment shown, the measuring cell 1 is a capacitive cell made of ceramics, for measuring relative pressure. It comprises a basic body 5 and a measuring diaphragm 7. The basic body 5 consists, for example, of ceramics. The measuring diaphragm 7 can likewise consist of ceramics or, for example, of sapphire. The measuring diaphragm 7 and the basic body 5 are connected to one another at their edge in a pressure-tight and gas-tight fashion by means of a joint 9, a measuring chamber being formed. The measuring diaphragm 7 is pressure sensitive, i.e. a pressure acting on it effects a deflection of the measuring diaphragm 7 from its rest position.

An electrode 11 is arranged on an inner surface of the measuring diaphragm 7, and at least one counter-electrode 13 is arranged facing the inner surface of the basic body 5. The electrode 11 of the measuring diaphragm 7 is electrically connected through the joint 9 and is connected outside to ground, for example. The counter-electrode 13 of the basic body 5 is electrically connected through the basic body 5 to the outside thereof, and leads to an electronic sensor system 15 arranged on the basic body 5. The electrode 11 and counter-electrode 13 form a capacitor, and the electronic sensor system 15 converts the changes in capacitance of the capacitor into, for example, an electric voltage which changes correspondingly.

The basic body 5 has a through-bore into which a tubelet 17 is inserted which connects an interior of the measuring cell mount 3 to the measuring chamber. Via the tubelet 17, a reference pressure $P_R$ present in the measuring cell mount 3 to which the pressure to be measured is to be related acts on an inner surface of the measuring diaphragm 7. This is illustrated symbolically by an arrow in FIG. 1.

In operation, a pressure P to be measured acts on an outer surface of the measuring diaphragm 7. This is likewise illustrated symbolically in FIG. 1 by an arrow.

The pressure P and the reference pressure $P_R$ effect a deflection, dependent on the relative pressure to be measured, of the measuring diaphragm 7 which is detected by the previously described capacitive electromechanical transducer and converted into an electric measured variable by the electronic sensor system 15. The measured variable is available for further processing and/or evaluation via connecting lines 19.

Instead of the capacitive ceramic measuring cell described, it is also possible to use a piezoresistive measuring cell, for example. In these types of measuring cells, the transducer has a strain gauge mounted on the measuring diaphragm. In the case of these measuring cells, as well, the measuring chamber can be formed of a basic body, on which the measuring diaphragm is fastened with its outer edge, and the measuring diaphragm itself.

The measuring cell mount 3 is essentially cylindrical, and has an end which faces the process during operation, and an end turned away from the process during operation. It preferably consists of a metal, for example of a stainless steel. The measuring cell 1 is fixed in the measuring cell mount 3 in such a way that the measuring diaphragm 7 points in the direction facing the process, and the basic body 5 points in the direction turned away from the process.

The measuring cell mount 3 has an essentially cylindrical outer element 21 and a likewise essentially cylindrical inner element 23, arranged coaxially therewith. At its end turned away from the process, the inner element 23 has a shoulder 24 which extends radially outward and rests on an end face, turned away from the process, of the outer element 21. In order to connect the inner element 23 to the outer one, screws are provided which are screwed through the shoulder 24 into corresponding bores in the outer element 21. An end face of the inner element 23 facing the process serves as support for the measuring cell 1.

The electronic sensor system 15 is encapsulated in a protective cushion 25. The protective cushion 25 is preferably made from a very soft material, and serves the purpose of keeping mechanical force effects away from the electronic sensor system 15 and from its connection to the connecting lines 19. An inner space of the measuring cell mount 3, which is bounded by the measuring cell 1, the hollow cylinder 23 and the protective cushion 25, is filled with a encapsulation 27. The encapsulation 27 preferably has a very low water absorption. Polyurethanes, for example, can be used. Materials with low water absorption are generally very hard and are therefore not suitable for holding mechanically sensitive assemblies. However, since according to the invention the electronic sensor system 15 is protected mechanically by the protective cushion 25, such an encapsulation with a very low water absorption can be used here.

A foam plastic is preferably suitable as a protective cushion 25. As investigations have shown, the best results are achieved with a foam plastic which has open and closed cells. Particularly because of the open cells, these materials are very soft and transmit virtually no forces from outside onto the electronic sensor system 15. They behave in a fashion similar to a sponge and are particularly easy to compress. Because of this property, a thermal expansion of air enclosed in the protective cushion 25 or of enclosed gas effects virtually no action of force on the electronic sensor system 15.

Foam plastics also offer the advantage that they can be prefabricated and mounted on the electronic sensor system 15. Moreover, because of the closed cells it is impossible for a mixed-cell foam plastic to be filled with the liquid casting compound for the encapsulation 27 during the production of the pressure sensor, which would then harden in the protective cushion 25 and render the latter brittle and inelastic.

In the exemplary embodiment illustrated in FIG. 1, a metallic cover 28 is provided which extends between the protective cushion 25 and the encapsulation 27. The cover 28 is preferably continued along a base face of the basic body 5, turned away from the process, and surrounds a cylindrical outer lateral surface of the measuring cell 1. The cover 28 has only two openings, which are as small as possible. The connecting lines 19 are lead through a first opening, and the tubelet 17, which serves to feed the reference pressure $P_R$, is lead through a second one.

In an appropriately designed absolute pressure sensor, which has no tubelet for feeding a reference pressure, an opening in the metallic cover 28 for the tubelet is lacking, of course.

The metallic cover 28 fulfills two tasks. Firstly, it effects a partial metallic encapsulation of the measuring cell 1 and electronic sensor system 15. For this purpose, it is preferably connected to frame or to a reference potential such as, for example, circuit zero, or to an input of the pressure meter. It forms a mostly closed Faraday cage via which electromagnetic interference acting from outside can flow off.

Secondly, it forms an extremely effective moisture guard for enclosed components. The metallic cover 28 forms a diffusion barrier layer which prevents moisture which has become incorporated into the encapsulation 27 over time from reaching the protective cushion 25 and the electronic sensor system 15 arranged therein.

The metallic cover 28 is preferably electrically insulated from the measuring cell mount 3. As illustrated in the right-hand half of FIG. 1, this is performed, for example, by arranging a ring 30 made from an insulator, for example a plastic, on an outer surface of the metallic cover 28 which is in the shape of an annular disk and is turned away from the measuring cell. The inner element 23 of the measuring cell mount 3 rests on a surface of the ring 30 which is in the form of an annular disk and is turned away from the measuring cell.

Alternatively, as illustrated on the left-hand side of FIG. 1, the metallic cover 28 may comprise cutouts, for example holes arranged in a circle, through which supports 32 which are integrally formed on the inner element 23 at the end in the direction facing the measuring cell extend as far as the measuring cell 1. The metallic cover 28 does not touch the supports 32.

A seal 29 is injected into a radial gap between the measuring cell 1 and the measuring cell mount 3. The seal 29 is preferably arranged at an end of the measuring cell 1 facing the process, and surrounds an outer cylindrical lateral surface of the measuring diaphragm 7 and the joint 9. The injected seal 29 consists, for example, of a silicone or of a polyurethane. These materials are particularly suitable for being injected into narrow gaps. They fill up the gap completely and permit optimum sealing quality even in the case of measuring cell mounts 3 with large manufacturing tolerances and in the case of large irregularities at the interface with the measuring cell 1 such as can occur, in particular, in the surroundings of the joint 9.

A further advantage of the injected seal 29 consists in that no force is required on the seal 29 for it to develop its sealing effect. This offers the great advantage that the measuring cell 1 is free from tension or clamping in the radial direction. Clamping of whatever type in the radial direction could lead to a variation in the pressure-dependent sensitivity of the measuring diaphragm 7, and cause measuring errors.

In case the pressure sensor is to be used in an environment with, strong temperature fluctuations, the measuring cell 1, the injected seal 29 and the measuring cell mount 3 preferably have radial dimensions that the radial thermal expansion of the measuring cell 1 and the injected seal 29 together is equal to the radial thermal expansion of the measuring cell mount 3.

As a result of such dimensioning of the assemblies, they expand or contract in like manner in the event of a change in temperature. The measuring cell 1, in particular the measuring diaphragm 7, is thereby protected against strains.

Upon injection, the seal 29 bonds with the measuring cell mount 3 and the measuring cell 1. The bonding action of the seal 29 fixes the measuring cell 1 in the measuring cell mount 3 in the direction facing the process. In the direction turned away from the process, the measuring cell 1 is supported on the inner element 23.

The above-described pressure sensor is a modular assembly wherein of which the electronic sensor system 15 is reliably protected against moisture, and wherein the electronic sensor system 15 and the connecting lines 19 are reliably protected against the actions of mechanical force.

On a cylindrical outer lateral surface turned away from the process, the pressure sensor has an external thread 31 onto which there is screwed a meter housing 33 fitted with an opening of the same shape provided with an internal thread. It is possible, for example, to arrange in the meter housing 33 a progressive electronic system which further processes the measured variables made available by the electronic sensor system 15 via the connecting lines 19 and, for example, emits an output signal which is desired in a specific application. Output signals used with particular frequency are, for example, signal currents whose current amplitude changes as a function of the currently measured value, or digital signals which are launched onto a bus line via a bus interface.

In the direction facing the process, the pressure sensor is connected to a process connection 35 which serves the purpose of securing the pressure meter, comprising the meter housing 33, pressure sensor and process connection 35, at a site. In the exemplary embodiment shown, the process connection 35 has a radially outwardly extending shoulder 37 which rests with an annular surface facing the measuring cell mount 3 on an annular surface of the measuring cell mount 3. The process connection 35 is secured by means of screws 38 which are screwed through the shoulder 27 into the measuring cell mount 3. At an end turned away from the pressure measuring cell, the process connection 35 has an external thread 39 by means of which the pressure meter is then to be secured at a measuring place (not illustrated in FIG. 1). Other types of securing, for example by means of a flange connection, can likewise be used.

The process connection 35 has a central axial throughbore 41 which widens out to form a chamber 43 in front of the measuring diaphragm 7. The chamber 43 is bounded by the measuring diaphragm 7, the process connection 35 and a seal 45 which is clamped between an outer pressure-insensitive annular surface of the measuring diaphragm 7 and an outer annular surface of the process connection 35 facing the measuring diaphragm 7. The process connection 35 has an annular circumferential groove which faces the measuring diaphragm and into which the seal is inserted. A pressure P present at the measuring place acts on the measuring diaphragm 7 via the bore 41 and the chamber 43.

The process connection 35 is screwed against the pressure sensor so as to clamp the measuring cell 1 between the inner element 23 and the process connection 35 in a fashion compressing the seal 45. In this case, the seal 45 effects firstly a strain-free clamping of the measuring cell 1 in the measuring cell mount 3, and secondly a process-side sealing between an interior space of the measuring cell mount 3 and the chamber 43.

The interior space of the measuring cell mount 3 is, of course, additionally protected by the injected seal 29. It is thereby possible to exchange the process connection 35 at will, and/or to mount the pressure sensor even without the process connection 35. By contrast with the seal 45, which is an axial seal, after all, the injected seal 29 is a radial seal. Consequently, it is possible for the process connection 35 to be exchangeably fashioned in front of the injected seal 29 in the direction facing the process without impairment of the sealing action. Again, at a gap existing between the measuring cell mount 3 and the process connection 35 at the connecting point thereof the seal 29 ensures that the interior space of the measuring cell mount 3 is sealed off from the surroundings of the pressure sensor.

Figure 2:
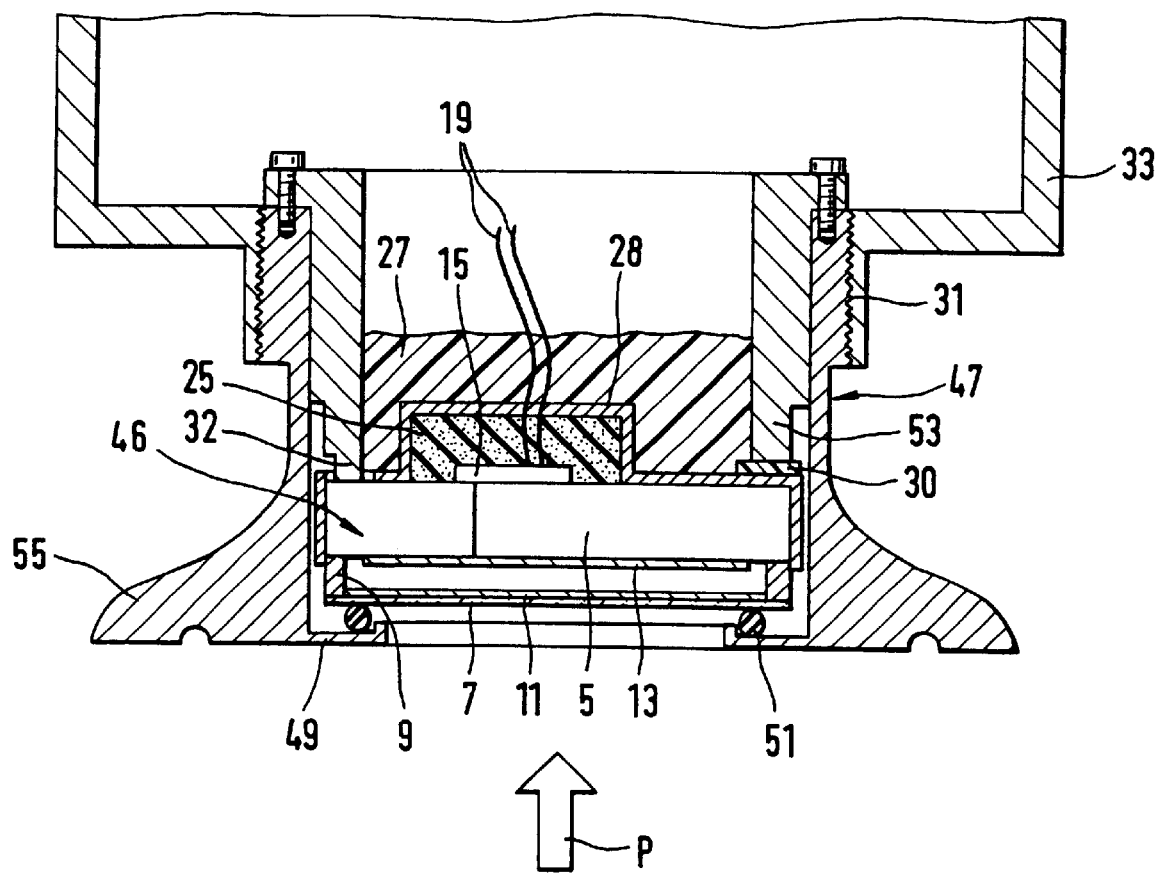
FIG. 2 shows a section through a pressure sensor with an integrated process connection, which is connected to a meter housing.

FIG. 2 shows a section through a further exemplary embodiment of a pressure sensor according to the invention. Because of the large degree of correspondence between the two exemplary embodiments, only the differences are explained in more detail below.

The exemplary embodiment of FIG. 2 is an absolute pressure sensor. It has a measuring cell 46, which is of identical design to the measuring cell 1 previously described, but whose interior space is evacuated and has no connection to the outside, in particular no reference air tubelet.

The pressure sensor has a measuring cell mount 47 which is connected to a meter housing 33 via an external thread 31. Otherwise than in the case of the exemplary embodiment illustrated in FIG. 1, here the process connection is not a separate assembly, but an integral constituent of the measuring cell mount 47.

The measuring cell mount 47 is essentially cylindrical and has at the end in the direction facing the process an opening with a shoulder 49 which extends radially inward and on which the measuring diaphragm 7 rests with its outer, pressure-insensitive edge, with the interposition of a seal 51, for example an O ring. The measuring cell mount 47 has an essentially cylindrical inner element 53 which is pressed against the measuring cell 1 from the side turned away from the process. It has a radially outwardly extending shoulder with which it rests on an end face of the outer measuring cell mount 47 which is in the shape of an annular disk and is turned away from the measuring cell. It is connected thereto by means of screws and thus presses against the measuring cell, which is thereby in turn pressed against the seal 51.

In order to secure the measuring cell mount 47 at a measuring place, the measuring cell mount 47 is provided with a process connection 55 (illustrated only diagrammatically) which is an integral constituent of the measuring cell mount 47. The process connection 55 illustrated is a standard connection which is defined in the international standard ISO 2852. This connection is known in metrology by the trade name of "Triclamp". It is also possible to use other types of securing.

The radially injected seal can be eliminated here because of the seal 51 and the design of the process connection as an integral constituent of the pressure sensor.

What is claimed is:

1. A pressure sensor, having:

a measuring cell for measuring a pressure;

a measuring cell mount, wherein said measuring cell is mounted in said measuring cell mount; and an electronic sensor system for providing an output signal indicative of the pressure measured by said measuring cell, said electronic sensor system being connected to said measuring cell, wherein said electronic sensor system is encapsulated in a protective cushion, and the space surrounding said protective cushion is filled with an encapsulation material.

2. The pressure sensor as claimed in claim 1, wherein a seal is injected in a gap existing in the radial direction between said measuring cell and said measuring cell mount.

3. The pressure sensor as claimed in claim 2, wherein because of the dimensions of said measuring cell, said injected seal and said measuring cell mount, a thermal expansion of said measuring cell and injected seal in the radial direction is equal to a thermal expansion of said measuring cell mount in the radial direction.

4. The pressure sensor as claimed in claim 2, wherein said injected seal consists of one of: a silicone and of polyurethane.

5. The pressure sensor as claimed in claim 1, wherein said protective cushion is a foam plastic.

6. The pressure sensor as claimed in claim 3, wherein said foam plastic has open and closed cells.

7. The pressure sensor as claimed in claim 1, wherein said encapsulation material is a polyurethane.

8. The pressure sensor as claimed in claim 1, wherein a metallic cover is provided which runs between said encapsulation material and said protective cushion.

* * * * *